(12) United States Patent
Kraemer et al.

(10) Patent No.: US 11,396,790 B2
(45) Date of Patent: Jul. 26, 2022

(54) SYSTEM AND METHOD OF TREATING A SUBTERRANEAN FORMATION WITH A DIVERTING COMPOSITION

(71) Applicant: SCHLUMBERGER TECHNOLOGY CORPORATION, Sugar Land, TX (US)

(72) Inventors: Chad Kraemer, Katy, TX (US); Bruno Lecerf, Houston, TX (US); Zinaida Usova, Tomsk (RU); William Troy Huey, San Antonio, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/103,763

(22) PCT Filed: Dec. 2, 2014

(86) PCT No.: PCT/US2014/068147
§ 371 (c)(1),
(2) Date: Jun. 10, 2016

(87) PCT Pub. No.: WO2015/088827
PCT Pub. Date: Jun. 18, 2015

(65) Prior Publication Data
US 2016/0312573 A1    Oct. 27, 2016

Related U.S. Application Data

(60) Provisional application No. 61/914,073, filed on Dec. 10, 2013.

(51) Int. Cl.
*E21B 33/138* (2006.01)
*E21B 43/26* (2006.01)
(Continued)

(52) U.S. Cl.
CPC ............ *E21B 33/138* (2013.01); *C09K 8/426* (2013.01); *C09K 8/70* (2013.01); *E21B 43/26* (2013.01);
(Continued)

(58) Field of Classification Search
None
See application file for complete search history.

(56) References Cited

U.S. PATENT DOCUMENTS 5,030,011 A * 7/1991 Kronberg ............ B01F 7/00175
366/279
7,845,413 B2   12/2010 Shampine et al.
(Continued)

FOREIGN PATENT DOCUMENTS

| CA | 2670416 A1 * | 12/2010 | .............. F04B 47/00 |
| CN | 101553552 A | 10/2009 | |
| WO | 2013085410 A1 | 6/2013 | |

OTHER PUBLICATIONS

International Search Report and Written Opinion issued in International Application No. PCT/US2014/068147 dated Mar. 20, 2015 (16 pages).
(Continued)

*Primary Examiner* — Charles R Nold

(57) ABSTRACT

A system and method for treating a subterranean formation. The method may include utilizing a diluted stream and a high-loading stream which are combined to form a diverting composition. The diverting composition may then be injected into a wellbore. The system may include devices to prepare the diluted stream and high-loading stream, combine the streams, and introduce the combined stream into the wellbore.

9 Claims, 4 Drawing Sheets

(51) Int. Cl.
*C09K 8/70* (2006.01)
*C09K 8/42* (2006.01)
*E21B 43/267* (2006.01)

(52) U.S. Cl.
CPC .......... *E21B 43/261* (2013.01); *E21B 43/267* (2013.01); *C09K 2208/08* (2013.01)

(56) References Cited

U.S. PATENT DOCUMENTS

| | | | |
|---|---|---|---|
| 8,056,635 B2 | 11/2011 | Shampine et al. | |
| 8,336,631 B2 | 12/2012 | Shampine et al. | |
| 2006/0113077 A1 | 6/2006 | Willberg et al. | |
| 2007/0277982 A1 | 12/2007 | Shampine et al. | |
| 2008/0049544 A1 | 2/2008 | Bingham et al. | |
| 2008/0093073 A1 | 4/2008 | Bustos et al. | |
| 2009/0255674 A1* | 10/2009 | Boney | E21B 33/138 166/284 |
| 2009/0277634 A1 | 11/2009 | Case et al. | |
| 2009/0277638 A1 | 11/2009 | Case et al. | |
| 2009/0281006 A1* | 11/2009 | Walters | C09K 8/68 507/270 |
| 2012/0048548 A1* | 3/2012 | Crews | C09K 8/602 166/278 |
| 2012/0181034 A1 | 7/2012 | Bour et al. | |
| 2012/0285692 A1 | 11/2012 | Potapenko et al. | |
| 2013/0233545 A1 | 9/2013 | Mahoney et al. | |
| 2014/0060828 A1* | 3/2014 | Nguyen | E21B 43/267 166/280.1 |
| 2014/0158358 A1* | 6/2014 | Pantano | C09K 8/60 166/300 |
| 2014/0269144 A1* | 9/2014 | Ayo | E21B 33/13 366/8 |
| 2016/0145988 A1* | 5/2016 | Case | E21B 43/26 166/298 |
| 2016/0312108 A1* | 10/2016 | Lestz | C09K 8/64 |

OTHER PUBLICATIONS

Khilar et al., "Chapter 5—Entrapment or Piping of Fines During Migration", Migrations of Fines in Porous Media, Springer Science+Business Media: Dordrecht, 1998, pp. 73-90.
Potapenko et al., "Barnett Shale Refracture Stimulations Using a Novel Diversion Technique", SPE 119636 presented at the 2009 SPE Hydraulic Fracturing Technology Conference, Jan. 19-21, 2009, The Woodlands, Texas, USA (11 pages).
Office Action issued in Russian Patent Appl. No. 2016125120/03(039329) dated Feb. 21, 2017; 13 pages (with English translation).
Decision on Grant issued in Russina Patent Application No. 2016125120 dated May 3, 2018; 13 pages.
Examination Report issued in Australian Patent Appl. No. 2014364184 dated Oct. 5, 2017; 3 pages.
Office Action issued in Chinese Patent Appl. No. 201480074903.2 dated Jan. 31, 2018; 14 pages.
Examination Report issued in Canadian patent application 2932109 dated Oct. 14, 2021, 3 pages.
"Record 6.299 million lb sand used in Texas frac", Oil and Gas Journal, vol. 84, No. 44, Nov. 3, 1986, pp. 28-29.
International Preliminary Report on Patentability issued in International Patent Application PCT/US2014/068147 dated Jun. 14, 2016, 11 pages.
Summary of Substantive Examination Report issued in Argentine Patent Application 20140104584, received Mar. 26, 2020, 2 pages.

* cited by examiner

SYSTEM AND METHOD OF TREATING A SUBTERRANEAN FORMATION WITH A DIVERTING COMPOSITION

BACKGROUND

Hydrocarbons (oil, condensate and gas) are typically produced from wells that are drilled into the formations containing them. For a variety of reasons, such as inherently low permeability of the reservoirs or damage to the formation caused by drilling and completion of the well, the flow of hydrocarbons into the well may be low. In this case, the well can be stimulated, using a variety of techniques, including hydraulic fracturing and chemical stimulation, or a combination of the two (referred to as acid fracturing).

In hydraulic and acid fracturing, a first fluid, called a pad, is injected into the formation to initiate and propagate a fracture. Then, a second fluid is injected to keep the fracture open after the pressure is released. The second fluid generally contains a proppant, such as sand. In acid fracturing, the second fluid also contains an acid or chelating agent that can dissolve part of the rock, which may cause irregular etching of the fracture face and removal of some of the mineral matter. This may result in the fracture not completely closing when the pumping is stopped.

In hydraulic fracturing, the operation may also be done without a high viscosity fluid (by using slick water) so as (1) to minimize the damage caused by polymers, (2) to generate a complex fracture network and (3) to reduce cost.

During the drilling of a wellbore, various fluids may be used for multiple functions. The fluids may be circulated through a drill pipe and a drill bit into the wellbore, and then may subsequently flow upward through the wellbore to the surface. During the circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate fluids from the formation by providing a sufficient hydrostatic pressure to prevent the ingress of the fluids onto the wellbore, to cool or lubricate the drill string and drill bit, and/or to maximize a penetration rate.

One concern during drilling is lost circulation, which is characterized by the loss of a drilling mud into a downhole formation. The downhole formations may be formations that include shale, sands, gravel, shell beds, reef deposits, limestone, dolomite chalk, or other particulates. Lost circulation can occur naturally in formations that are fractured, highly permeable, porous, cavernous or vugular. Additionally, drilling problems may include stuck pipe, hole collapse, loss of well control, and decreased or lost production.

To control lost circulation, including additives in fluids injected into wellbores is known. A common additive to control or avoid lost circulation is bentonite, which can seal small holes or fractures. Bentonite, in higher concentrations, will also increase viscosity and slow fluid flow into the surrounding rock. Other solids, such as ground paper, ground corn cobs and sawdust have also been used to control fluid loss. Polymers may also be used to increase the viscosity of a wellbore fluid and to control fluid loss. However, polymer additives are often more expensive than particulates such as bentonite.

In both hydraulic and acid fracturing of horizontal wells and multi-layered formations, diverting techniques may be used to enable fracturing redirection between different zones. Known diverting methods include mechanical isolation devices such as packers, as well as well bore plugs, setting bridge plugs, pumping ball sealers, pumping slurred benzoic acid flakes and removable or degradable particulates. Other treatments, such as matrix acidizing, may also utilize diversion.

When diversion using removable diverting materials is performed, the diversion is generally based upon bridging of some particles of the diverting material and forming a plug by accumulating the rest of the particles at the formed bridge. However, when removable materials are used in a typical treatment diversion, the bridging ability of the diverting slurry may be reduced because of dilution with a wellbore fluid. Further, poor stability of plug formed from various diverting materials is another concern during such a diversion procedure.

Plugging or diverting a downhole feature with solid diverting materials may be achieved when the diverting agent is at a high loading (e.g., at a high concentration), such as from about 20 lbs/1000 gal to about 1000 lbs/1000 gal, or from about 40 lbs/1000 gal to about 750 lbs/1000 gal) in order to form temporary plugs or bridges. The removable material may also be used at concentrations at least 4.8 g/L (40 lbs/1,000 gal), at least 6 g/L (50 lbs/1,000 gal), or at least 7.2 g/L (60 lbs/1,000 gal). High loading may lead to multiple particle blocking of porous media. However, achieving a high loading of a diverting agent within a stream of treatment fluid is challenging. The ability to add a solid in a continuous manner with traditional solid feeders, which are limited in their feeding rates, is difficult. Because the treatment fluid is to be injected at a high rate, often exceeding 50 barrels (bbl)/min, the rate of addition of the diverting agent should be substantial enough to create a stream of high loading solid material. Solid material may be in the form of manufactured shapes such as flakes, fibers and particles. The traditional methods of adding solid material cannot easily achieve a rapid injection of high concentrations of diverting agent so as to achieve a suitable stream, and when such methods are repeated during the treatment of the well, errors may be compounded.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The statements made merely provide information relating to the present disclosure, and may describe some embodiments illustrating the subject matter of this application.

In a first aspect, a method for injecting a diverting composition is disclosed. The method may include transporting a diluted fluid stream to a high pressure flow line, transporting a high-loading stream to the high pressure flow line, combining the diluted fluid stream and the high-loading stream to form a diverting composition, and introducing the diverting composition into the wellbore.

In a second aspect, a system for injecting a diverting composition is described. The system may include at least one diluted fluid device that transports a diluted fluid stream to a high pressure flow line, and at least one high-loading device that transports a high-loading stream to the high pressure flow line. The diluted fluid stream and the high-loading stream may be combined to form a diverting composition, and the diverting composition may be introduced into the wellbore.

In a third aspect, a method for pumping a diverting composition is disclosed. The method may include pumping a diluted fluid stream to a high pressure flow line, pumping a high-loading stream to the high pressure flow line, combining the diluted fluid stream and the high-loading stream to form a diverting composition, and introducing the diverting composition into the wellbore. The diluted fluid stream may include a first amount of degradable fibers, a viscosifying agent and water. The high-loading stream may include a second amount of degradable fibers, a gelling agent, and water.

DETAILED DESCRIPTION

Figure 1:
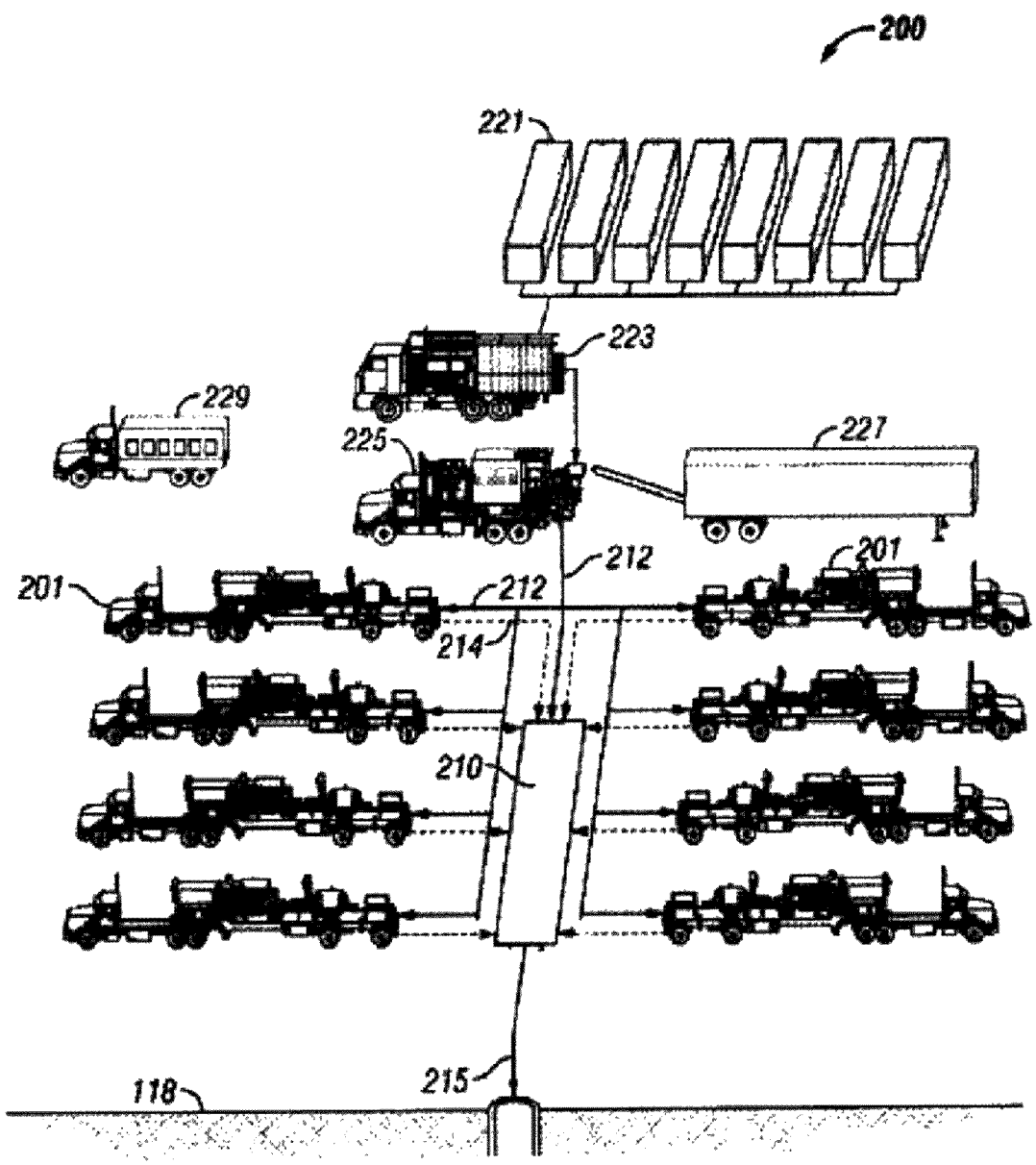
FIG. 1 shows a schematic representation of a treatment configuration of the related art.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The following definitions are provided in order to aid those skilled in the art in understanding the detailed description.

The term "wellbore" encompasses a drilled hole or borehole, including the open hole or uncased portion of the well that is drilled during a treatment of a subterranean formation. The term "wellbore" does not include the wellhead, or any other similar apparatus positioned over wellbore.

The term "injecting" describes the introduction of a new or different element into a first element. In the context of this application, injection of a fluid, solid or other compound may occur by any form of physical introduction, including but not limited to pumping.

The term "fracturing" refers to the process and methods of breaking down a geological formation and creating a fracture, i.e., the geological formation around a well bore, in order to increase production rates from a hydrocarbon reservoir. The fracturing methods otherwise use techniques known in the art.

The term "matrix acidizing" refers to a process where treatments of acid or other reactive chemicals are pumped into the formation at a pressure below which a fracture can be created. The matrix acidizing methods otherwise use techniques known in the art.

The term "diverting agent" is a chemical agent used in stimulation treatments to ensure uniform injection over the area to be treated. Diverting agents, also known as chemical diverters, function by creating a temporary blocking effect that is cleaned up following the treatment.

In some embodiments, the diverting agent includes removable diverting materials which may be degradable material and/or dissolvable material. A degradable material refers to a material that will at least partially degrade (for example, by cleavage of a chemical bond) within a desired period of time such that no additional intervention is used to remove the plug. For example, at least 30% of the removable material may degrade, such as at least 50%, or at least 75%. In some embodiments, 100% of the removable material may degrade. The degradation of the removable material may be triggered by a temperature change, and/or by chemical reaction between the removable material and another reactant. Degradation may include dissolution of the removable material.

Removable materials for use as the diverting agent may be in any suitable shape: for example, powder, particulates, beads, chips, or fibers. When the removable material is in the shape of fibers, the fibers may have a length of from about 2 to about 25 mm, such as from about 3 mm to about 20 mm. In some embodiments, the fibers may have a linear mass density of about 0.111 dtex to about 22.2 dtex (about 0.1 to about 20 denier), such as about 0.167 to about 6.67 dtex (about 0.15 to about 6 denier). Suitable fibers may degrade under downhole conditions, which may include temperatures as high as about 180° C. (about 350° F.) or more and pressures as high as about 137.9 MPa (about 20,000 psi) or more, in a duration that is suitable for the selected operation, from a minimum duration of about 0.5. about 1, about 2 or about 3 hours up to a maximum of about 24, about 12, about 10, about 8 or about 6 hours, or a range from any minimum duration to any maximum duration.

The removable materials may be sensitive to the environment, so dilution and precipitation properties should be taken into account when selecting the appropriate removable material. The removable material used as a sealer may survive in the formation or wellbore for a sufficiently long duration (for example, about 3 to about 6 hours). The duration should be long enough for wireline services to perforate the next pay sand, subsequent fracturing treatment(s) to be completed, and the fracture to close on the proppant before it completely settles, providing an improved fracture conductivity.

Further suitable removable materials and methods of use thereof include those described in U.S. Patent Application Publication Nos. 2006/0113077, 2008/0093073, and 2012/0181034, the disclosures of which are incorporated by reference herein in their entireties. Such materials include inorganic fibers, for example of limestone or glass, but are more commonly polymers or co-polymers of esters, amides, or other similar materials. They may be partially hydrolyzed at non-backbone locations. Any such materials that are removable (due in-part because the materials may, for example, degrade and/or dissolve) at the appropriate time under the encountered conditions may also be employed in the methods of the present disclosure. For example, polyols containing three or more hydroxyl groups may be used. Suitable polyols include polymeric polyols that solubilizable upon heating, desalination or a combination thereof, and contain hydroxyl-substituted carbon atoms in a polymer chain spaced from adjacent hydroxyl-substituted carbon atoms by at least one carbon atom in the polymer chain. The polyols may be free of adjacent hydroxyl substituents. In some embodiments, the polyols have a weight average molecular weight from about 5000 to about 500,000 Daltons or more, such as from about 10,000 to about 200,000 Daltons.

Further examples of removable materials include polyhdroxyalkanoates, polyamides, polycaprolactones, polyhydroxybutyrates, polyethyleneterephthalates, polyvinyl alcohols, polyethylene oxide (polyethylene glycol), polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. For example, suitable removable materials for use as diverting agents include polylactide acid; polycaprolactone; polyhydroxybutyrate; polyhydroxyvalerate; polyethylene; polyhydroxyalkanoates, such as poly[R-3-hydroxybutyrate], poly[R-3-hydroxybutyrate-co-3-hydroxyvalerate], poly[R-3-hydroxybutyrate-co-4-hydroxyvalerate], and the like; starch-based polymers; polylactic acid and copolyesters; polyglycolic acid and copolymers; aliphatic-aromatic polyesters, such as poly(ε-caprolactone), polyethylene terephthalate, polybutylene terephthalate, and the like; polyvinylpyrrolidone; polysaccharides; polyvinylimidazole; polymethacrylic acid; polyvinylamine; polyvinylpyridine; and proteins, such as gelatin, wheat and maize gluten, cottonseed flour, whey proteins, myofibrillar proteins, casins, and the like. Polymers or co-polymers of amides, for example, may include polyacrylamides.

Removable materials, such as, for example, degradable and/or dissolvable materials, may be used in the diverting agent at high concentrations (such as from about 20 lbs/1000 gal to about 1000 lbs/1000 gal, or from about 40 lbs/1000 gal to about 750 lbs/1000 gal) in order to form temporary plugs or bridges. The removable material may also be used at concentrations at least 4.8 g/L (40 lbs/1,000 gal), at least 6 g/L (50 lbs/1,000 gal), or at least 7.2 g/L (60 lbs/1,000 gal). The maximum concentrations of these materials that can be used may depend on the surface addition and blending equipment available.

Suitable removable diverting agents also include dissolvable materials and meltable materials (both of which may also be capable of degradation). A meltable material is a material that will transition from a solid phase to a liquid phase upon exposure to an adequate stimulus, which is generally temperature. A dissolvable material (as opposed to a degradable material, which, for example, may be a material that can (under some conditions) be broken in smaller parts by a chemical process that results in the cleavage of chemical bonds, such as hydrolysis) is a material that will transition from a solid phase to a liquid phase upon exposure to an appropriate solvent or solvent system (that is, it is soluble in one or more solvent). The solvent may be the carrier fluid used for fracturing the well, or the produced fluid (hydrocarbons) or another fluid used during the treatment of the well. In some embodiments, dissolution and degradation processes may both be involved in the removal of the diverting agent.

Such removable materials, for example dissolvable, meltable and/or degradable materials, may be in any shape: for example, powder, particulates, beads, chips, or fibers. When such material is in the shape of fibers, the fibers may have a length of about 2 to about 25 mm, such as from about 3 mm to about 20 mm. The fibers may have any suitable denier value, such as a denier of about 0.1 to about 20, or about 0.15 to about 6.

Examples of suitable removable fiber materials include polylactic acid (PLA) and polyglycolide (PGA) fibers, glass fibers, polyethylene terephthalate (PET) fibers, and the like.

In some embodiments, the diverting agent content may include pre-processed fiber flocks, which represent solids entrapped inside a fiber network.

The term "diverting composition" refers to a composition comprising a diverting agent plus a carrier fluid. The carrier fluid may include water, fresh water, seawater, connate water or produced water. The carrier fluid may also include hydratable gels (such as guars, polysaccharides, xanthan, hydroxy-ethyl-cellulose, or other similar gels), a cross-linked hydratable gel, a viscosified acid (such as a gel-based viscosified acid), an emulsified acid (such as an oil outer phase emulsified acid), an energized fluid (such as an $N_2$ or $CO_2$ based foam), and an oil-based fluid including a gelled, foamed, or otherwise viscosified oil. The carrier fluid may be a brine, and/or may include a brine. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In embodiments, the carrier fluid includes a poly-amino-poly-carboxylic acid, such as a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate, or other similar compositions.

The term "particulate" or "particle" refers to a solid 3D object with maximal dimension less than 1 meter. Here, "dimension" of the object refers to the distance between two arbitrary parallel planes, each plane touching the surface of the object at least at one point.

The term "treatment" or "treating" refers to any subterranean operation that uses a fluid in conjunction with a desired function and/or for a desired purpose. The term "treatment" or "treating" does not imply any particular action by the fluid.

As shown in FIG. 1, a system for pumping a fluid may include a pumping system 200 for pumping a fluid from a surface 118 of a well 120 to a wellbore 122 during an oilfield operation. The operation may be a hydraulic fracturing operation, and the fluid may be a fracturing fluid. The pumping system 200 includes a plurality of water tanks 221, which feed water to a gel maker 223. The gel maker 223 combines water from the water tanks 221 with a gelling agent so as to form a gel. The gel is then transported to a blender 225 where it is mixed with a proppant from a proppant feeder 227 to form a fracturing fluid.

The fracturing fluid is then pumped at a low pressure (such as 60-120 pounds per square inch (psi)) from the blender 225 to plunger pumps 201 via the line 212. Each plunger pump 201 receives the fracturing fluid at a low pressure and discharges it into a common manifold 210 (sometimes called a missile trailer or missile) at a high pressure as shown by the discharge lines 214. The common manifold 210 then directs the fracturing fluid from the plunger pumps 201 to the wellbore 122 via the line 215. A computerized control system 229 may be employed to direct the entire pump system 200 for the duration of the operation.

In such a system, each of the pumps 201 may be exposed to an abrasive proppant of the fracturing fluid. Accordingly, according to embodiments, a split stream configuration may be designed to allow a fracturing fluid to be pumped into the wellbore.

In a conventional split stream configuration, as disclosed in U.S. Pat. No. 7,845,413 to Shampine et al., which is hereby incorporated by reference in its entirety, a pump system can be operated whereby the fluid that is pumped from a well surface to a wellbore is split into a clean side containing primarily water as well as a dirty side containing solids in a fluid carrier. In a fracturing operation, the dirty side may contain a proppant in a fluid carrier, and the clean side would not be exposed to abrasive fluids.

In some embodiments, a split stream configuration is designed to ultimately transport a diverting composition, which may be a diverting slurry, into a wellbore. The diverting composition may be used at some time during a treatment operation, including a hydraulic fracturing or acid fracturing operation. The diverting composition may be injected to partially or fully close a fracture in a subterranean formation so as to perform a diversion operation.

As disclosed in U.S. Patent Application Publication No. 2012/0285692 to Potapenko et al., which is hereby incorporated by reference in its entirety, the diversion performed using the diverting composition may be for diversion or for temporal zonal isolation. The diversion composition may be made of blends of particles or blends of particles and flakes. The size of the largest particles or flakes in the blends according to embodiments may be slightly smaller than the diameter of the perforation holes in the zone to isolate or divert.

According to embodiments, the size of the particles or flakes in the blends may be larger than an average width of the void intended to be closed or temporally isolated. The average width of the void may be the smallest width of the void after the perforation hole or another entry in such void, at 10 cm, at 20 cm, at 30 cm, at 50 cm or at 500 cm (when going into the formation from the wellbore). The void may be a perforation tunnel, hydraulic fracture or wormhole. In some embodiments, the ratio between particles and flakes in the blends may reduce permeability of the formed plugs.

Figure 2:
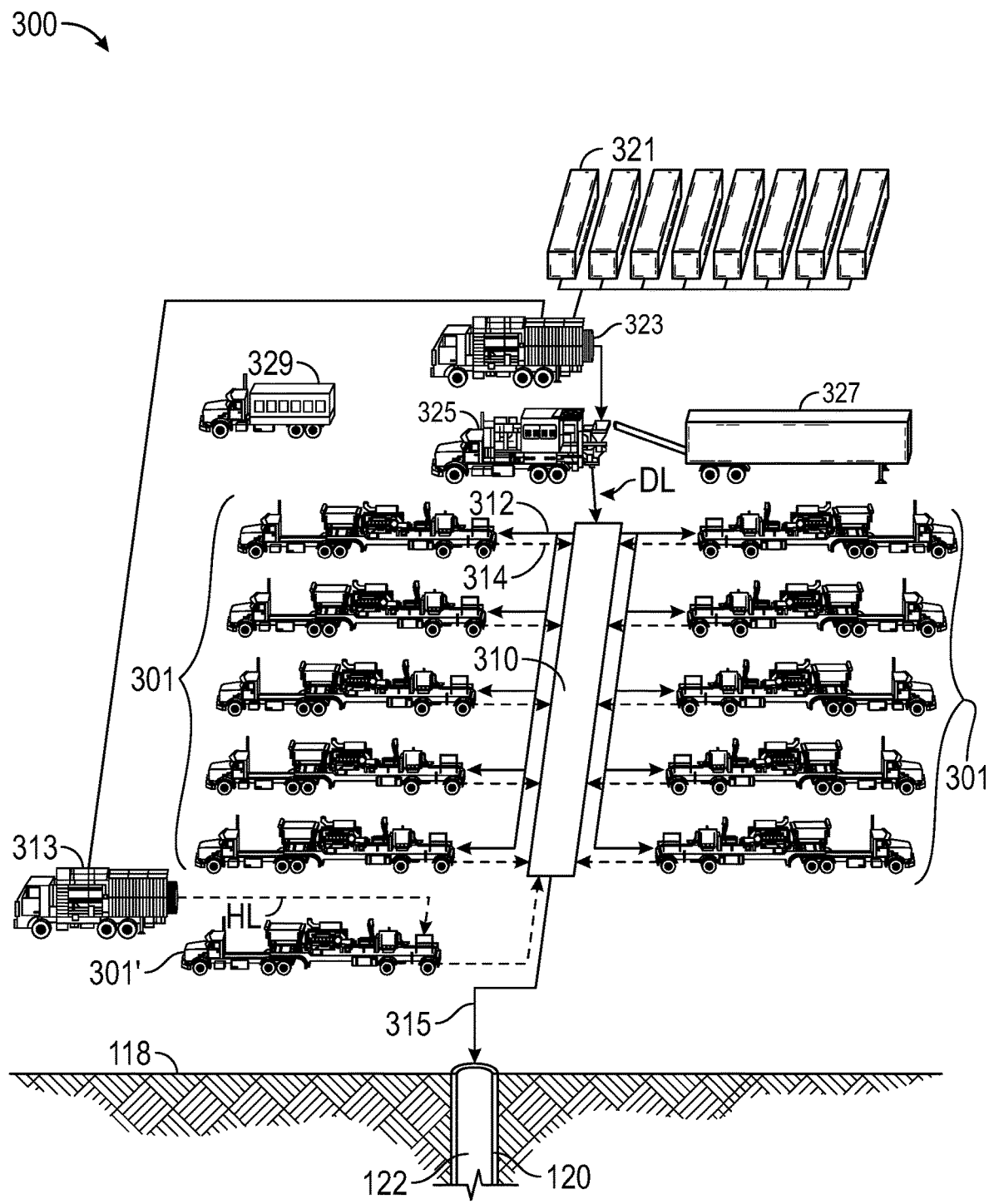
FIG. 2 shows a schematic representation of a treatment configuration according to one or more embodiments herein.

In embodiments, a method for injecting a diverting composition into a subterranean formation may include a split stream configuration. As can be seen in FIG. 2, the diverting composition may be formed at a point prior to injection in the wellbore.

FIG. 2 shows an injecting system 300 for injecting a diverting fluid from a surface 118 of a well 120 to a wellbore 122 during an oilfield operation. The injection may occur by pumping or by another form of introduction. The operation may be for a diverting treatment to be performed at some point during a fracturing or other treatment. The injecting system 300 includes a plurality of water tanks 321, which feed water downstream. The injecting system 300 also includes tank 323, which feeds a viscosifying agent to a blender 325 where it may be mixed with an amount of proppant from proppant tank 327 and an amount of solid to form a diluted stream. In some embodiments, the solid may be in the form of manufactured shapes, which may include degradable fibers, particles, or a combination of the two.

The diluted stream is then pumped at a low pressure (such as 60-120 psi) from the blender 325 to plunger pumps 301 via the diluted stream line DL. Each plunger pump 301 receives the diverting fluid at a low pressure and discharges it into a common manifold 310.

Additionally, an amount of water from the water tanks 321 may be combined with a gelling agent supplied by tank 323 so as to form a gel. A diverting agent may be included with the gel at diverting agent truck 313 so as to form a high-loading stream. In some embodiments, the diverting agent may include an amount of manufactured shapes, which may be in the form of fibers, particles or flakes. The mixture of the manufactured shapes and the gel may occur by a process such as batch mixing. The resultant mixture formed as the high-loading stream may be in the form of a slurry.

The high-loading stream may pass through the high-loading stream line HL and reach the pumps 301' whereby the high-loading stream will be mixed and then pumped into the common manifold 310 which may include or be directly or indirectly connected to a high pressure flow line. The pumps 301' may be high-loading pumps. In the common manifold, the high-loading stream and the diluted stream may then be mixed to form a diverting composition. The common manifold 310 may then direct the diverting composition from the plunger pumps 301 to the wellbore 122 via the line 315. In embodiments, the high-loading stream and the diluted stream may be combined outside of the common manifold 310, such as downstream of the manifold, which may be by connecting iron or by connecting the high-loading streams and the diluted stream at the wellhead.

A computerized control system 329 may be employed to direct the entire pump system 300 for the duration of the operation.

In embodiments, the pumps 301' may be high pressure pumps such as positive displacement pumps, multi-stage centrifugal pumps or combinations thereof. In some embodiments, the pumps 301' may be devices capable of injecting a diverting agent in the form of a ball. Thus, the pumps 301' may be ball injectors, as described in WO 2013/085410 to Lecerf et al., which is hereby incorporated by reference in its entirety. In embodiments where the pumps 301' are ball injectors, the high-loading stream will include a ball-type diverting agent. The pumps 301' may also be suitable for injected destructible containers or containers carrying a fluid and intended to be broken mechanically or otherwise at some point during or after injection into a wellbore.

The following description relates to the high-loading stream.

In embodiments, the components of the high-loading stream other than the diverting agent are components of a carrier fluid. The carrier fluid may include water, fresh water, seawater, connate water or produced water. The carrier fluid may also include hydratable gels (such as guars, polysaccharides, xanthan, hydroxy-ethyl-cellulose, or other similar gels), a cross-linked hydratable gel, a viscosified acid (such as a gel-based viscosified acid), an emulsified acid (such as an oil outer phase emulsified acid), an energized fluid (such as an $N_2$ or $CO_2$ based foam), and an oil-based fluid including a gelled, foamed, or otherwise viscosified oil.

The carrier fluid may be a brine, and/or may include a brine. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In embodiments, the carrier fluid includes a poly-amino-poly-carboxylic acid, such as a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate, or other similar compositions.

The high-loading stream also contains a diverting agent which may include degradable fibers of manufactured shapes at high loading, generally more than 100 lb/1000 gal.

In embodiments, the manufactured shapes which may be used may be round particles, such as, for example, particles having an aspect ratio less than about 5, or less than about 3. The particles may be of dimensions which are optimized for plugging or diverting, such as disclosed in Potapenko et al. (US2012/0285692). Though some particles may be round in embodiments, the particles may not have to be round. The particles may include some round particles and some particles of other shapes, or may include no round particles at all. In embodiments where the particles include round particles and other shapes, the particles of other shapes may be cubes, tetrahedrons, octahedrons, plate-like shapes (flakes), oval etc.

Also, the particles can include sand, different types of ceramics used for producing proppant, as well as alumino-silicates, such as muscovite mica. In addition, the diverting agent may include mixtures of fibers, sand, particles, film and other similar components.

In embodiments where fibers are included in the high-loading stream, the fibers may be any of inorganic or organic fibrous materials and can be either degradable or stable at bottomhole conditions. Embodiments may include fiber materials such as PLA and PGA fibers, glass fibers, or PET fibers. In embodiments, pre-processed fiber flocks representing solids entrapped inside the fiber network may be included.

The diverting agent may include manufactured shapes that may be made of a swellable material. The swellable materials may be any materials that swell in the presence of hydrocarbons, water or mixtures of thereof. In embodiments, these may include elastomers, swellable resins, swellable polymers, or clays. The materials may be one or more of x-linked polyacrylamides and polyacrylic acid derivatives, smectite clay, bentonite, oil-swellable rubber, water-swellable elastomers and mixtures of thereof.

The swellable materials can be in any form and size, including grains, spheres, fibers, shaped particulates, beads, and balls. The swellable materials may also be degradable or dissolvable in the presence of acids, hydroxides, amines or other reagents. Swelling time of the particles can be also controlled by slowly dissolvable coatings, additives in the base fluid or in the composition of the swellable material as well as by changing temperature.

In embodiments, the diverting agent including the fibers and swellable materials may be suspended in the carrier fluid.

In embodiments, the swellable materials may swell in the plug so that a decrease in the plug conductivity results, which will thereby reduce the rate of fluid penetration in the isolated zone. Control of the plug permeability may be performed by replacement of the fluid that surrounds the plug with the fluid that causes shrinkage of the swelled particles. In embodiments where polyacrylamide particles are used as swellable component and initial swelling happens in a water-based fluid, then shrinkage of the swelled particles may be caused by exposure to organic solvents or brines with high salinity. Hydrocarbons can be also used to case shrinkage of swelled bentonite grains.

Other swellable particles can be modified proppants comprising a proppant particle and a hydrogel coating. The hydrogel coating is applied to a surface of the proppant particle and localizes on the surface to produce the modified proppant.

In some embodiments, the diverting agent may include polylactide resin particles. The polylactide resin can be molded into different shapes and sizes.

The following relates to the diluted stream.

The diluted stream may include a carrier fluid. The carrier fluid may be the same, or may differ from the carrier fluid in the high-loading stream. In embodiments, the diluted stream may include a fluid with a lower viscosity than the fluid in the high-loading stream, which can be obtained by using the same gelling agent as in the high-loading stream, but in lesser quantity.

The diluted stream may contain manufactured shapes, or may not carry any manufactured shape. In embodiments where manufactured shapes are included, such shapes may be the same ones as in the high-loading stream. In such embodiments, the shapes may be included at a lower loading (e.g., a lower concentration) than the shapes in the high-loading stream. Further, the manufactured shapes in the diluted stream may be a shape of a smaller dimension than those in the high-loading stream.

In embodiments, the high-loading stream may contain large degradable particles of a diameter of 4 mesh to 10 mesh or larger. The diluted stream may contain comparatively smaller degradable particles, such as those of diameter 10 mesh to 100 mesh or smaller. In embodiments, the particle size and distribution of particles will be optimized when the high-loading and diluted streams converge.

In embodiments, the diluted stream may contain a material of a shape different than in the high-loading stream. The diluted stream may contain fiber shapes while the high-loading stream may contain particulate shapes, or vice versa. In embodiments, the high-loading stream may contain a variety of shapes, while the diluted stream contains less variety of shape. In some embodiments, the high-loading stream may contain both fibers and particles, while the diluted stream contains fibers. The diluted stream would still contain a lower loading of manufactured shapes than the high-loading stream, when expressed in weight of shaped particles by volume of the stream.

In embodiments, the high-loading stream and the diluted stream are injected into the common manifold at particular rates. The high-loading stream may be injected at about 1 to about 20 bbl/min, or about 5 to about 10 bbl/min, or about 7 bbl/min. The diluted stream may be injected at about 1 to about 100 bbl/min, or about 25 to about 65 bbl/min, or about 43 bbl/min. The total injection rate at the manifold and subsequently into the wellbore will thus be about 2 to about 120 bbl/min, or about 30 to about 75 bbl/min, or about 50 bbl/min.

Then, to complete the operation, a cleaning operation may be performed. This can include pumping an amount of fiber to clean the lines, then stopping pumping fiber, and then, once the last fraction of proppant has passed the perforations, slowing down the injection rate when squeezing particles through the perforations.

The following example describes a treatment utilizing a diverting composition and method according to one or more embodiments.

A horizontal well is being fractured in sections, with sections delimited by bridge plugs. Each section is 300 ft long and has 6 one-foot perforation clusters, separated by 50 ft. Each perforation cluster contains six perforations. The section is being treated with two stages of 80,000 lbs of proppant, and each stage is separated by injecting a diverting agent which is a mixture of manufactured shapes. The shapes include particles and beads of various size and fibers.

A diverting agent (also referred to as a plugging or diverting pill) includes 50 lbs of particles includes 8.4 pounds (lbs) of fibers in 5 bbl of 25-lb linear gel. This corresponds to 238 lbs/1000 gal of particles and 50 lbs/1000 gal of fiber. The high-loading stream is injected into the line connecting the manifold to the wellhead (i.e., downstream of the manifold, identified as line 315 in FIG. 2) at about 7 bbl/min while the diluted stream is injected at about 43 bbl/min to bring the injection rate at 50 bbl/min. The diverting composition derived as a result of the combination of the high-loading stream and the diluted stream has a volume of 36 bbl, a particle loading of 33.3 ppt (parts per thousand), and a fiber loading of 50 ppt.

The high-loading stream is prepared in a mixing tub of a cement mixing/blender float. 30 minutes before the last fraction of proppant has entered the wellbore, diverting material is added in the batch mixer. Specifically, the mixing tub is filled with 5 bbl of water gelled with 25 lbs of linear gel. 8.4 lbs of fiber are mixed. Then, 50 lbs of a particulate blend are added to achieve a desired concentration, and the stream is then mixed.

To pump the diverting agent, once the last fraction of proppant has passed the pump, the proppant is cut and 20 bbl of crosslinked fluid is injected. Then, the crosslinker is cut and 20 bbl of linear gel is injected.

To prepare the diluted stream, at a pod blender (which is disposed at a low pressure side of the diluted stream), a dry additive feeder may be set to 50 lbs of fiber/1000 gal of WF125 gel. The rate of the diluted stream is set to 43 bbl/min so that the total rate of fracturing equipment (the high-loading stream and the diluted stream) equals 50 bbl/min.

Figure 3:
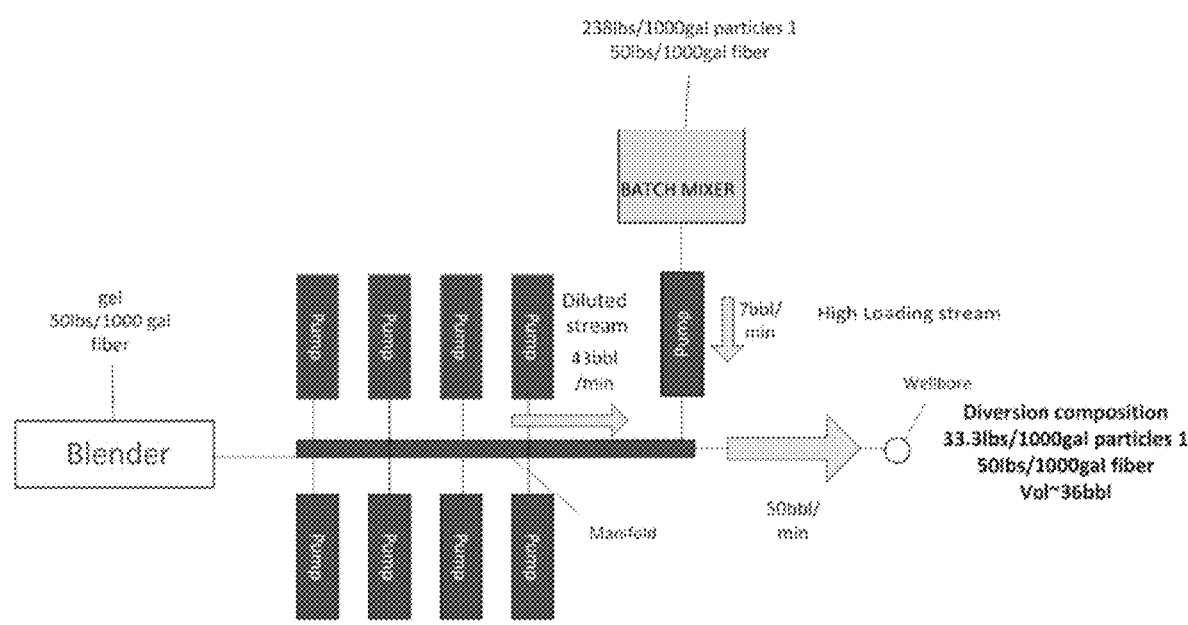
FIG. 3 shows a diagram of a treatment configuration according to one or more embodiments herein.

As can be seen in FIG. 3, the diluted stream is pumped at a rate of 43 bbl/min, whereas the high-loading stream, mixed in a batch mixed, is pumped at a rate of 7 bbl/min. The total pumping rate is 50 bbl/min once the streams are combined to form the diverting composition.

To mix the high-loading stream with the diluted stream, the high-loading stream is pumped as fast as possible on dedicated pump while maintaining rate of other fracturing pumps.

After the mixing of the high-loading stream with the diluting stream, a cleaning operation including pumping 5 bbl from fiber-laden fluid to clean the lines that were used to pump the high-loading stream is performed. Then, the fiber pumping is stopped, and once the last fraction of proppant has passed the perforations, the injection rate is slowed to 20 bbl/min when squeezing particles through the perforations.

Figure 4:
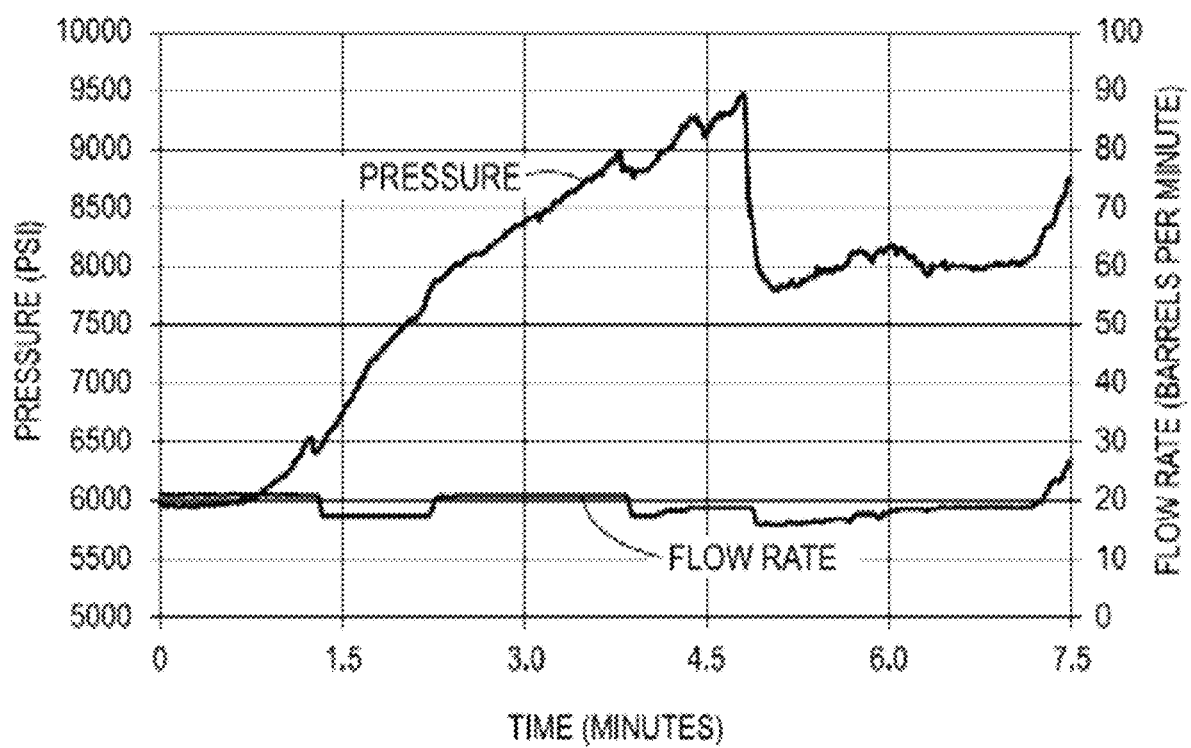
FIG. 4 shows a graphical representation of pressure changes with respect to time according to one or more embodiments herein.

As shown in FIG. 4, the diverting composition according to the embodiments described herein allows for an observed pressure when the diverting composition hits the perforation ranges to be from 450 to 3100 pounds per square inch (psi). At stage #10, when the pressure increase reaches an amplitude of 3500 psi, the pressure went down sharply and stabilized at a pressure gain of 2180 psi. This shows that the pressure increased by 3500 psi when the diverter hit the perforations. The pressure went down sharply later on, but still remained very high. Overall, the gain in treatment pressure shows that perforation clusters were plugged effectively using the diverting composition.

Although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A method for pumping a diverting composition, comprising:
    providing a diverting agent truck that comprises a batch mixer;
    using the diverting agent truck to prepare, via batch mixing, a high-loading stream comprising a diverting agent, wherein the diverting agent comprises degradable fibers that are present in the high-loading stream at a concentration higher than 100 lb/1000 gal;
    pumping a diluted fluid stream at a pressure between 60 and 120 psi to at least one plunger pump via a diluted stream line;
    pumping the high-loading stream through a high-loading stream line to at least one high-loading pump;
    combining the diluted fluid stream and the high-loading stream to form a diverting composition; and
    introducing the diverting composition into the wellbore, wherein the diluted fluid stream comprises a first amount of the degradable fibers, a gelling agent and water, and wherein the high-loading stream comprises a second amount of the degradable fibers, a gelling agent, and water.

2. The method according to claim 1, wherein the diverting composition is injected into the wellbore at about 50 bbl/min.

3. The method according to claim 1, wherein at least one diluted fluid device that transports the diluted fluid stream to the at least one discharge line, and at least one high-loading device that transports the high loading stream to the at least one discharge line are each pumps.

4. The method according to claim 1, wherein at least one diluted fluid device that transports the diluted fluid stream to the at least one discharge line, and at least one high-loading device that transports the high loading stream to the at least one discharge line are each ball injectors.

5. The method according to claim 1, wherein the high-loading stream comprises a carrier fluid.

6. The method according to claim 1, wherein the diluted fluid stream comprises a carrier fluid.

7. The method according to claim 1, wherein the high-loading stream is transported at about 5 to about 10 bbl/min.

8. The method according to claim 1, wherein the diluted fluid stream is transported at about 25 to about 65 bbl/min.

9. The method according to claim 1, wherein the diverting composition is injected into the wellbore at about 30 to about 75 bbl/min.

* * * * *